(12) United States Patent
Mevius et al.

(10) Patent No.: US 8,286,660 B2
(45) Date of Patent: Oct. 16, 2012

(54) VALVE BODY WITH DUAL SENSE MECHANISM

(75) Inventors: Jason S. Mevius, McKinney, TX (US); James C. Hawkins, Allen, TX (US); Seth A. Kranz, Royse City, TX (US); Gregory L. Foust, Plano, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 708 days.

(21) Appl. No.: 12/427,419

(22) Filed: Apr. 21, 2009

(65) Prior Publication Data

US 2009/0260697 A1 Oct. 22, 2009

Related U.S. Application Data

(60) Provisional application No. 61/046,788, filed on Apr. 21, 2008.

(51) Int. Cl.
*F16K 17/34* (2006.01)

(52) U.S. Cl. ........... 137/484.8; 137/505.11; 137/505.12; 137/505.47

(58) Field of Classification Search ............... 137/484.6, 137/484.8, 505.11, 505.12, 505.47
See application file for complete search history.

(56) References Cited

U.S. PATENT DOCUMENTS

| | | |
|---|---|---|
| 1,945,834 A | 2/1934 | Terry |
| 2,042,781 A | 6/1936 | Grove |
| 2,261,364 A | 11/1941 | Grove |
| 2,273,111 A | 2/1942 | Kindl |
| 2,599,577 A | 6/1952 | Norgren |
| 2,619,983 A | 12/1952 | Roberts |
| 2,624,980 A | 1/1953 | Hughes |
| 2,664,674 A | 1/1954 | Niesemann |
| 3,086,548 A | 4/1963 | Galiger et al. |
| 3,392,749 A | 7/1968 | Gneiding et al. |
| 3,424,194 A | 1/1969 | Kruzan et al. |
| 3,542,052 A | 11/1970 | Irwin |
| 3,722,536 A | 3/1973 | Hill et al. |
| 3,742,972 A | 7/1973 | Hughes |

(Continued)

FOREIGN PATENT DOCUMENTS

DE 35 32 751 A1 3/1987

(Continued)

OTHER PUBLICATIONS

Australian Office Action for Application No. 2008242823, dated Aug. 25, 2011.

(Continued)

*Primary Examiner* — Eric Keasel
(74) *Attorney, Agent, or Firm* — Marshall, Gerstein & Borun LLP

(57) ABSTRACT

A gas regulator includes an actuator, a regulator valve, and a secondary device. Downstream pressure feedback is provided to the actuator and the secondary device via a Pitot tube disposed within an outlet of the regulator valve. The Pitot tube has a first branch having an end connected to the actuator to place the actuator control cavity and diaphragm in fluid communication with downstream pressure within the outlet for maintaining the outlet pressure at an actuator setpoint pressure. The Pitot tube also has a second branch having an end connected to the secondary device to place the interior of the secondary device in fluid communication with downstream pressure within the outlet for responding to changes in the downstream pressure when the outlet pressure diverges from a predetermined normal operating pressure range.

14 Claims, 9 Drawing Sheets

U.S. PATENT DOCUMENTS

| | | | |
|---|---|---|---|
| 4,176,677 | A | 12/1979 | Hughes |
| 5,161,576 | A | 11/1992 | Hekkert et al. |
| 5,285,810 | A | 2/1994 | Gotthelf |
| 5,586,569 | A | 12/1996 | Hanning et al. |
| 6,192,912 | B1 | 2/2001 | Butler et al. |
| 6,354,319 | B1 | 3/2002 | Mooney |
| 6,796,326 | B2 | 9/2004 | Bayer |
| 6,886,583 | B2 | 5/2005 | Matsushima et al. |
| 6,923,197 | B2 | 8/2005 | Vitale |
| 2004/0187930 | A1 | 9/2004 | Hawkins et al. |
| 2005/0011554 | A1 | 1/2005 | Davila et al. |
| 2006/0086919 | A1 | 4/2006 | Yang |
| 2007/0272316 | A1 | 11/2007 | Zecchi et al. |
| 2008/0258096 | A1 | 10/2008 | Hawkins |

FOREIGN PATENT DOCUMENTS

| | | | |
|---|---|---|---|
| DE | 40 12 801 | A1 | 10/1991 |
| DE | 295 06 de395 | U1 | 6/1995 |
| DE | 198 21 292 | A1 | 11/1999 |
| FR | 2 451 597 | A1 | 10/1980 |
| WO | WO-99/23544 | A1 | 5/1999 |

OTHER PUBLICATIONS

International Preliminary Report on Patentability for Application No. PCT/US2009/041001, dated Aug. 30, 2011.

International Preliminary Report on Patentability for Application No. PCT/US2009/041257, dated Oct. 26, 2010.

International Preliminary Report on Patentability for Application No. PCT/US2009/041259, dated Oct. 26, 2010.

International Search Report and Written Opinion for Application No. PCT/US2009/041001, dated Aug. 25, 2011.

International Search Report and Written Opinion for Application No. PCT/US2009/041259, dated Oct. 15, 2010.

Emerson Process Management, "64 Series Pressure Reducing Regulator," Natural Gas Regulators Application Guide—Edition V, pp. 367-379 (2005).

Emerson Process Management, "66 Series Pressure Reducing Regulators," Natural Gas Regulators Application Guide—Edition V, pp. 29-72 (2005).

Emerson Process Management, "Principles of Direct-Operated Regulators," Natural Gas Regulators Application Guide—Edition V, pp. 471-476 (2005).

Emerson Process Management, "Principles of Series Regulation and Monitor Regulators," Natural Gas Regulators Application Guide—Edition V, pp. 493-495 (2005).

Emerson Process Management, "REGAL 2 Series Pressure Reducing Regulator," Natural Gas Regulators Application Guide—Edition V, pp. 239-245 (2005).

Emerson Process Management, "S200 Series Pressure Reducing Regulators," Natural Gas Regulators Application Guide—Edition V, pp. 259-272 (2005).

Emerson Process Management, "S300 Series Pressure Reducing Regulators," Natural Gas Regulators Application Guide—Edition V, pp. 289-306 (2005).

Emerson Process Management, "Selecting and Sizing Pressure Reducing Regulators," Natural Gas Regulators Application Guide—Edition V, pp. 479-483 (2005).

Emerson Process Management, "Type 63EG Relief Valve/Backpressure Regulator," Natural Gas Regulators Application Guide—Edition V, pp. 329-340 (2005).

Emerson Process Management, "Type EZL Pressure Reducing Regulator for Low Differential Pressure Applications," Natural Gas Regulators Application Guide—Edition V, pp. 169-179 (2005).

International Search Report and Written Opinion for Application No. PCT/US2009/041257, dated Aug. 14, 2009.

International Search Report and Written Opinion for Application No. PCT/US2008/060645, dated Apr. 17, 2008.

International Preliminary Report on Patentability for Application No. PCT/US2008/060645, dated Jun. 22, 2010.

VALVE BODY WITH DUAL SENSE MECHANISM

CROSS-REFERENCE TO RELATED APPLICATIONS

This application claims the benefit of priority to U.S. Provisional Patent Application No. 61/046,788, filed on Apr. 21, 2008, entitled "Valve Body with Dual Sense Mechanism," which is hereby expressly incorporated by reference herein

FIELD OF THE INVENTION

The present invention relates to fluid flow regulating devices such as gas regulators and, more particularly, to gas regulators having secondary devices sensing the same pressure from the same points of the devices, such as overpressure monitoring devices, slam shut devices, token alarm devices, and the like.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

In addition to a closed loop control, some conventional gas regulators include a balanced trim to improve the reaction of the gas regulator to variations in the downstream pressure. The balanced trim is adapted to reduce the influence of the upstream pressure on the performance of the gas regulator. The upstream pressure is placed in fluid communication with a balancing diaphragm to apply a force to the control element of the gas regulator in the opposite direction as the force of the downstream pressure. Accordingly, as the upstream pressure varies, a corresponding force is applied to balance the force created by the upstream pressure as described further below so that the gas regulator acts in response to the downstream pressure only.

Some conventional gas regulators also include secondary devices, such as overpressure monitoring devices, slam shut devices, token alarms and the like, that perform a responsive action if a sensed input pressure, such as a pressure downstream of the regulator, varies from a predetermined normal operating pressure range. An overpressure monitoring device controls the pressure downstream of the regulator in the event that the regulator fails, thereby allowing the downstream pressure to increase to undesired levels. In the event the regulator fails and the downstream pressure rises above a predetermined monitor setpoint pressure, the overpressure monitoring device operates to close the valve port of the regulator valve and cut off the flow of gas to the downstream components of the gas distribution system. As demand increases and/or the problem with the regulator is resolved and the downstream pressure drops, the monitoring device opens the valve port and thereby allows gas flow downstream.

In other implementations, the gas regulators require safety devices to shut off the flow of gas if the regulator fails or other conditions develop that cause an overpressure or underpressure situation downstream of the gas regulator. Most commonly, slam shut safety valves are used to shut of the gas flow in one of these situations, or when either situation occurs. The slam shut safety valve may generally be disposed at or upstream of the regulator so that the slam shut valve may prevent gas from reaching the pressure reducing regulator in the event of the overpressure or underpressure conditions. The slam shut valve monitors gas pressure downstream of the gas regulator for maximum and minimum pressure tolerances. If the downstream pressure exceeds a maximum setpoint pressure or drops below a minimum setpoint pressure, the slam shut safety valve closes, cutting off the flow of gas to the gas regulator and preventing uncontrolled leak of gas. Once closed, the slam shut valve typically remains closed until service is performed and the slam shut valve is manually reset. In other implementations, it may be preferable to use a secondary device in the form of a token alarm device that does not relieve pressure in an overpressure situation, but instead bleeds an amount of the gas to produce an odor alerting the end customer to contact the gas provider for servicing of the gas regulator.

FIGS. 1 (closed position) and 2 (full open position) depict one conventional gas regulator 10. The regulator 10 generally comprises an actuator 12 and a regulator valve 14. The regulator valve 14 defines an inlet 16 for receiving gas from a gas distribution system, for example, and an outlet 18 for delivering gas to an end-user facility such as a factory, a restaurant, an apartment building, etc. having one or more appliances, for example. Additionally, the regulator valve 14 includes a valve port 20 disposed between the inlet 16 and the outlet 18. Gas must pass through the valve port 20 to travel between the inlet 16 and the outlet 18 of the regulator valve 14.

The actuator 12 is coupled to the regulator valve 14 to ensure that the pressure at the outlet 18 of the regulator valve 14, i.e., the outlet pressure, is in accordance with a desired outlet or control pressure, known as the setpoint pressure. The actuator 12 is therefore in fluid communication with the regulator valve 14 via a valve mouth 22 and an actuator mouth 24. The actuator 12 includes a control assembly 26 for sensing and regulating the outlet pressure of the regulator valve 14. Specifically, the control assembly 26 includes a diaphragm 28, a piston 30, and a control arm 32 having a valve disc 34 operatively connected thereto. The conventional balanced trim valve disc 34 includes a generally cylindrical body 36 and a sealing insert 38 fixed to the body 36. The control assembly 26 may also include a balanced trim assembly 40 with a balancing diaphragm 42 to offset the force applied to the valve disc 34 by the upstream pressure. The actuator diaphragm 28 senses the outlet pressure of the regulator valve 14 via a Pitot tube 44 placing the outlet 18 in fluid communication with the interior of the actuator 12 and a bottom-side of the actuator diaphragm 28. The control assembly 26 further includes a control spring 46 in engagement with a top-side of the diaphragm 28 to offset the sensed outlet pressure. Accordingly, the desired outlet pressure, which may also be referred to as the control pressure or the actuator setpoint pressure, is set by the selection of the control spring 46.

The diaphragm 28 is operably coupled to the control arm 32, and therefore, the valve disc 34 via the piston 30, controls the opening of the regulator valve 14 based on the sensed outlet pressure. For example, when an end user operates an appliance, such as a furnace, for example, that places a demand on the gas distribution system downstream of the regulator 10, the outlet flow increases, thereby decreasing the outlet pressure. Accordingly, the diaphragm 28 senses this decreased outlet pressure. This allows the control spring 46 to expand and move the piston 30 and the right-side of the control arm 32 downward, relative to the orientation of FIG. 1. This displacement of the control arm 32 moves the valve disc 34 away from the valve port 20 to open the regulator valve 14. FIG. 2 depicts the valve disc 34 in a normal, open operating position. So configured, the appliance may draw gas through the valve port 20 toward the outlet 18 of the regulator valve 14.

In the conventional regulator 10 depicted in FIGS. 1 and 2, the control assembly 26 further functions as a relief valve, as mentioned above. Specifically, the control assembly 26 also includes a relief spring 48 and a release valve 50. The diaphragm 28 includes an opening 52 through a central portion thereof and the piston 30 includes a sealing cup 54. The relief spring 48 is disposed between the piston 30 and the diaphragm 28 to bias the diaphragm 28 against the sealing cup 54 to close the opening 52, during normal operation. Upon the occurrence of a failure such as a break in the control arm 32, the control assembly 26 is no longer in direct control of the valve disc 34 and inlet flow will move the valve disc 34 to an extreme open position. This allows a maximum amount of gas to flow into the actuator 12. Thus, as the gas fills the actuator 12, pressure builds against the diaphragm 28 forcing the diaphragm 28 away from the sealing cup 54, thereby exposing the opening 52. The gas therefore flows through the opening 52 in the diaphragm 28 and toward the release valve 50. The release valve 50 includes a valve plug 56 and a release spring 58 biasing the valve plug 56 into a closed position. Upon the pressure within the actuator 12 and adjacent the release valve 50 reaching a predetermined threshold pressure, the valve plug 56 displaces upward against the bias of the release spring 58 and opens, thereby exhausting gas into the atmosphere and reducing the pressure in the regulator 10.

While the release valve 50 operates to vent gas from the actuator 12, it typically does not relieve sufficient pressure to maintain the downstream pressure below the upper limit for which the regulator 10 is designed to regulate. For such situations, a secondary device such as those discussed above may be provided to control and cut off the gas flow, or minimally to alert the customer that an overpressure situations exists. In the configuration illustrated in FIGS. 1 and 2, an overpressure monitoring device 60 operates to cut off the flow through the regulator valve body 14 until the downstream pressure is reduced after the failure of the regulator 10. In the illustrated example, the monitoring device 60 has a similar configuration as the actuator 12. The monitor 60 is coupled to the regulator valve 14 opposite the actuator 12 and on the upstream side of the valve port 20. The monitor 60 is therefore in fluid communication with the regulator valve 14 via an upstream valve mouth 62 and a monitor mouth 64 connected by a monitor housing 66. The monitor 60 includes a control assembly 68 for sensing the pressure downstream of the regulator valve 14 and closing the valve 14 when the downstream pressure exceeds a monitor setpoint or cutoff pressure. The control assembly 68 includes a diaphragm 70, a piston 72, and a control arm 74 having a valve disc 76 operatively connected thereto. The monitor 60 has balanced trim, and the valve disc 76 includes a generally cylindrical body 78 and a sealing insert 80 fixed to the body 78. The balanced trim includes a balancing diaphragm 82 to offset the force applied to the valve disc 76 by the upstream pressure.

The monitor diaphragm 70 senses the outlet pressure of the regulator valve 14 via an external downstream pressure feedback line 84 connected to a port 86 of the monitor housing 66. The feedback line 84 places a downstream point remote from the regulator valve 14 in fluid communication with the interior of the monitor 60 and a bottom-side of the monitor diaphragm 70. The control assembly 68 further includes a control spring 88 in engagement with a top-side of the diaphragm 70 to offset the sensed downstream pressure. The desired setpoint or cutoff pressure is set by the selection and compression of the control spring 88. The diaphragm 70 is operably coupled to the control arm 74 and, therefore, the valve disc 76 via the piston 72, and controls the closing of the regulator valve 14 in an overpressure situation. A balancing spring 90 biases the valve disc 76 toward the open position as shown, and the piston 72 and control arm 74 are coupled so that the control arm 74 is only driven when the diaphragm 70 senses a downstream pressure greater than the cutoff pressure and flexes (not shown) upwardly to drive the piston 72. The diaphragm 70 and piston 72 also react to pressure decreases, but the piston 72 does not drive the control arm 74 when the downstream pressure is less than the cutoff pressure. In the event of a failure of the monitor 60, the monitor 60 may include a release valve 90 similar to the release valve 50 of the actuator 12 to vent gas into the atmosphere.

The regulator 10 having an actuator 12 and an overpressure monitor 60 as described above has two primary functions. First, the regulator 10 transfers a volume of fluid downstream while maintaining a consistent outlet pressure. Second, the regulator 10 ceases to allow fluid flow to the downstream portion of the distribution system if the outlet pressure can no longer be maintained by the regulator 10. As to the first function, a key aspect of the performance of the regulator 10 is how much fluid volume can be maintained at a certain pressure. To optimize the fluid volume, it is preferable to sense the downstream pressure as shown in FIGS. 1 and 2 within the outlet 18. The Pitot tube 44 as positioned provides rapid feedback of the downstream pressure to the control assembly 26 and eliminates the need for an external downstream pressure feedback line. Presently, such internal sensing has not been widely applied for secondary devices such as the monitoring device 60.

Performance can be compromised when the actuator 12 and a secondary device use different sensing locations, but external sensing is still predominantly used for overpressure monitors, slam shut valves, token alarms and other secondary devices. External sensing for secondary devices presents various problems. For example, piping downstream lines requires additional maintenance and can be costly for gas companies having many regulators in the field. Additionally, exposed downstream lines, if damaged, make the secondary devices inoperable. If the secondary device cannot sense the downstream pressure, the secondary device cannot cut off the fluid flow or otherwise signal that a problem exists, thereby leading the operators to the incorrect assumption that the regulator 10 is operating properly. Therefore, a need exists for an improved regulator having internal pressure sensing for both the actuator and the secondary device.

Internal pressure sensing for a secondary device has been provided in regulator valves configured to condition the fluid flow for more accurate pressure sensing at the outlet 18. The flow conditioning quickly transitions the fluid from turbulent flow to laminar flow to provide for more accurate sensing of the downstream pressure. In one example of flow conditioning shown in FIG. 3, the regulator valve 14 of the regulator 10 has a modified outlet 92 configured to receive a flow control subassembly. The flow conditioning subassembly includes a screen 94 having a plurality of baffles or a mesh screen, a semicircular sieve 96 with a plurality of holes therethrough, and a central sensing tube 98. An inward end of the sensing tube 98 is placed in fluid communication with the interior of the actuator 12 and the interior of the monitor 60 via passages 100, 102, respectively, and the port 86 is capped to prevent leakage. The fluid flow is converted from turbulent flow to laminar flow as the fluid passes between the screen 94 and through the sieve 96, resulting in a more accurate measurement of the downstream pressure at the sense point of the sensing tube 98. While being effective at conditioning the flow, the flow conditioning subassembly is relatively expensive to fabricate. Moreover, the subassembly requires significant and costly modifications to the standard regulator valve body and is not readily transitioned to other body sizes. Therefore, a need exists for internal dual pressure sensing for an actuator and a secondary device in a gas regulator that is less expensive to implement and readily implemented in a variety of regulator valve sizes and body types.

SUMMARY OF THE INVENTION

In one aspect, the invention is directed to a fluid regulating device that may include a regulator valve having an inlet, an outlet, and a valve port disposed between the inlet and the outlet, an actuator coupled to the regulator valve and comprising an actuator valve disc, the actuator valve disc disposed within the regulator valve and adapted for displacement between a closed position engaging a downstream side of the valve port and an open position disposed away from the valve port, and a secondary device coupled to the regulator valve and configured to sense an input pressure and to perform a responsive action if the sensed input pressure varies from a secondary device setpoint pressure. The fluid regulating device may further include a Pitot tube having a first end with a sensing point disposed within the outlet of the regulator valve, a first branch extending toward the actuator, and a second branch extending toward the secondary device. The first end and the first branch of the Pitot tube may place the sensing point and the outlet in fluid communication with an interior of the actuator, and the first end and the second branch of the Pitot tube may place the sensing point and the outlet in fluid communication with an interior of the secondary device. The actuator may be configured to cause the actuator valve disc to move toward the valve port when the pressure at the sensing point of the Pitot tube increases and to cause the actuator valve disc to move away from the valve port when the pressure at the sensing point decreases to maintain a pressure downstream of the fluid regulating device approximately equal to a regulator setpoint pressure, and the pressure at the sensing point may be the input pressure of the secondary device.

In another aspect, the invention is directed to a fluid regulating device that may have a regulator valve having an inlet, an outlet, and a valve port disposed between the inlet and the outlet, an actuator coupled to the regulator valve and comprising an actuator valve disc, the actuator valve disc disposed within the regulator valve and adapted for displacement between a closed position engaging a downstream side of the valve port and an open position disposed away from the valve port, and a secondary device coupled to the regulator valve and configured to sense an input pressure and to perform a responsive action if the sensed input pressure varies from a secondary device setpoint pressure. The fluid regulating device may further include a Pitot tube having a first end with a sensing point disposed within the outlet of the regulator valve, a first branch extending toward the actuator, and a second branch extending toward the secondary device. The first end and the first branch of the Pitot tube may place the sensing point and outlet in fluid communication with an interior of the actuator, and the first end and the second branch of the Pitot tube may place the sensing point and the outlet in fluid communication with an interior of the secondary device. The actuator may be configured to cause the actuator valve disc to move toward the valve port when the pressure at the sensing point of the Pitot tube increases and to cause the actuator valve disc to move away from the valve port when the pressure at the sensing point decreases to maintain a pressure downstream of the fluid regulating device approximately equal to a regulator setpoint pressure, and the pressure at the sensing point may be the input pressure of the secondary device.

In a further aspect, the invention is directed to a dual sensing mechanism for a fluid regulating device that may have a regulator valve having an inlet, an outlet, and a valve port disposed between the inlet and the outlet, an actuator coupled to the regulator valve and comprising an actuator valve disc, the actuator valve disc disposed within the regulator valve and adapted for displacement between a closed position engaging a downstream side of the valve port and an open position disposed away from the valve port, and a secondary device coupled to the regulator valve and configured to sense an input pressure and to perform a responsive action if the sensed input pressure varies from a secondary device setpoint pressure. The dual sensing mechanism may include a Pitot tube having a first end with a sensing point disposed within the outlet of the regulator valve, a first branch extending from the Pitot tube toward the actuator, wherein the Pitot tube and the first branch place the sensing point and the outlet in fluid communication with an interior of the actuator e, and a second branch extending from the Pitot tube toward the secondary device, wherein the Pitot tube and the second branch of the Pitot tube place the sensing point and the outlet in fluid communication with an interior of the secondary device. The actuator may be configured to cause the actuator valve disc to move toward the valve port when the pressure at the sensing point of the Pitot tube increases and to cause the actuator valve disc to move away from the valve port when the pressure at the sensing point decreases to maintain a pressure downstream of the fluid regulating device approximately equal to a regulator setpoint pressure, and the pressure at the sensing point may be the input pressure of the secondary device.

Additional aspects of the invention are defined by the claims of this patent.

BRIEF DESCRIPTION OF THE DRAWINGS

FIG. 9A is a cutaway elevational view of the valve body of the slam shut safety device of FIG. 6, specifically highlighting the reset pin in a relatch position.

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 4:
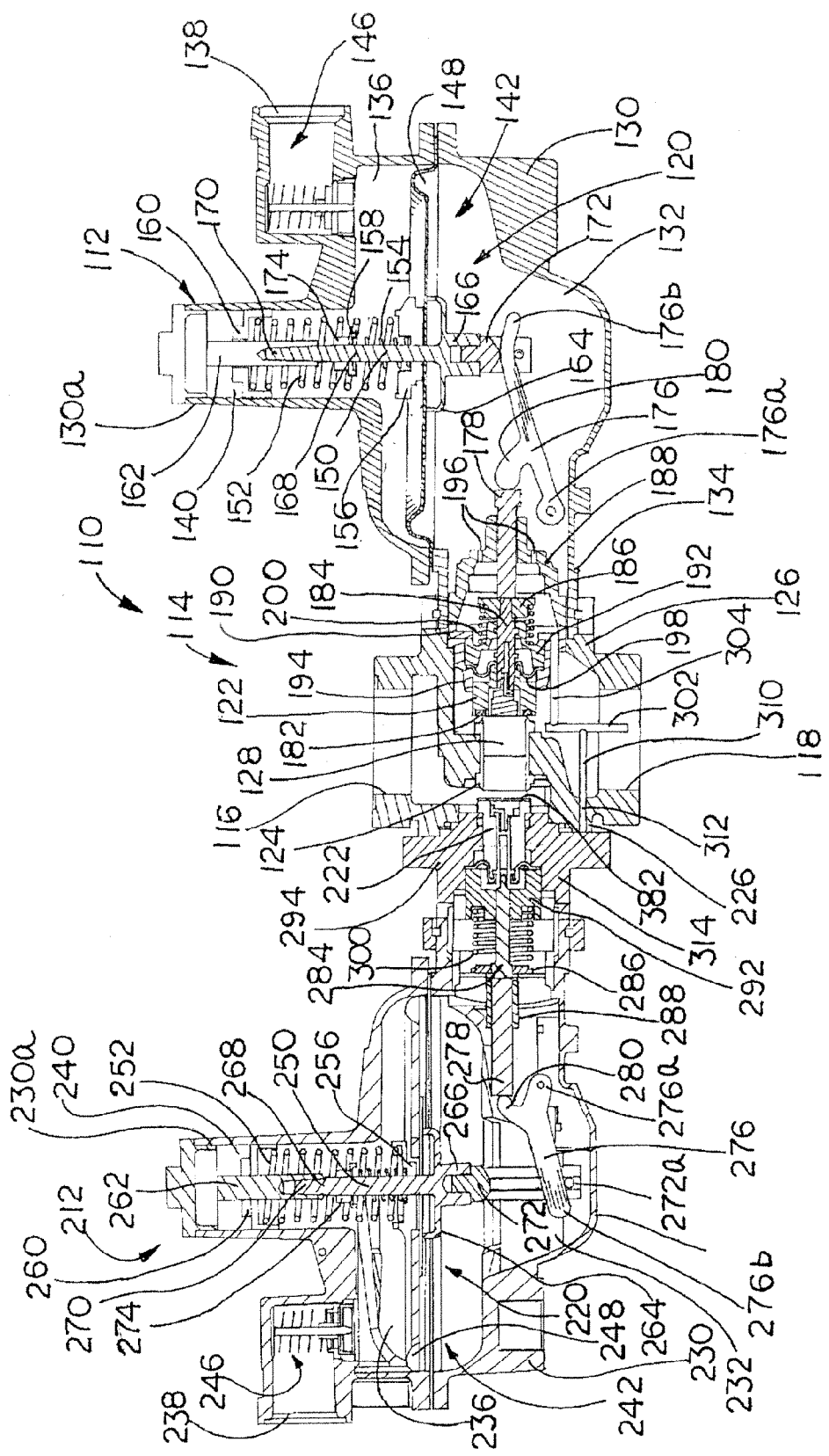
FIG. 4 is a side cross-sectional view of a gas regulator having dual pressure sensing for the actuator and the overpressure monitor in accordance with the present disclosure in a closed position.
Figure 5:
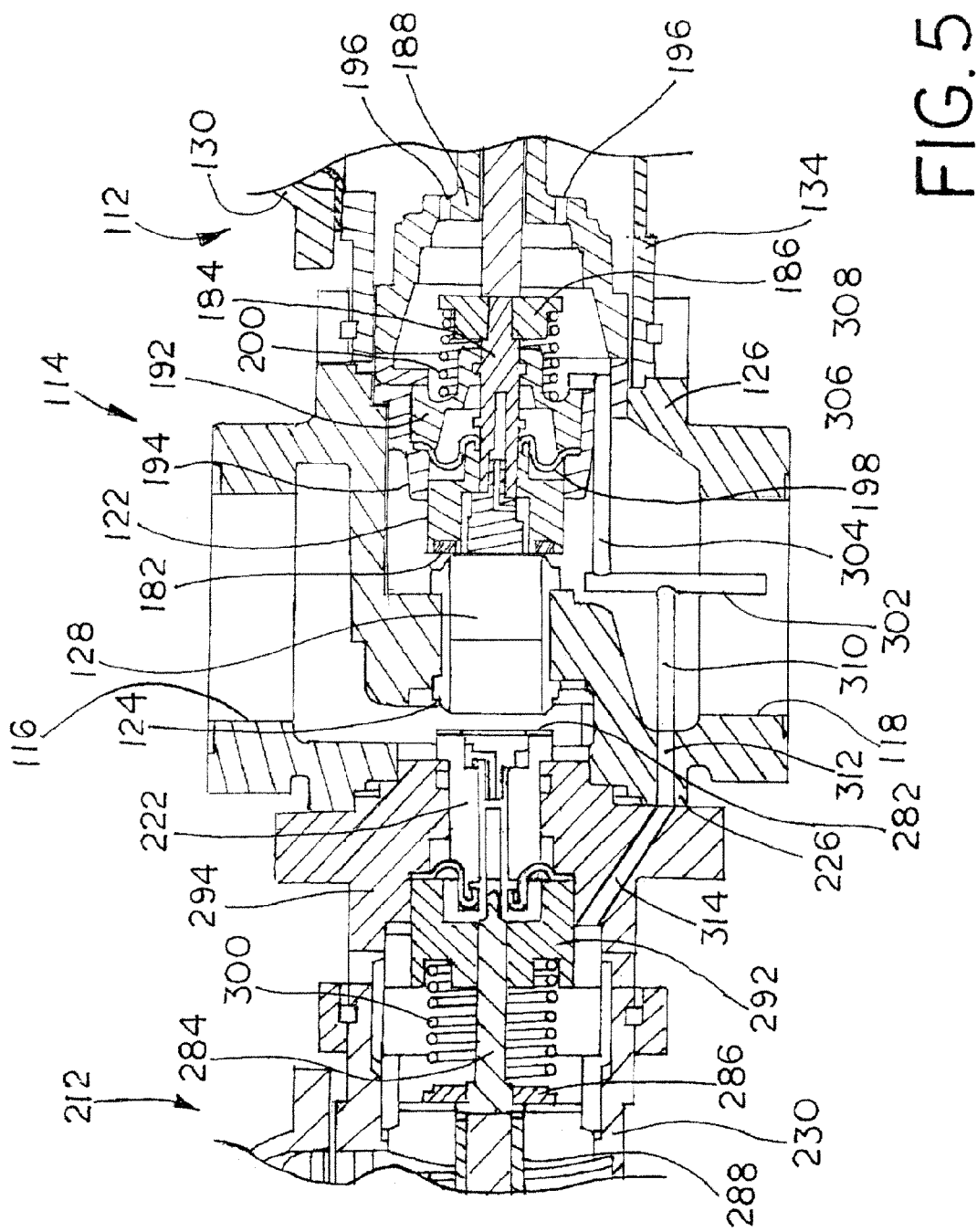
FIG. 5 is a side cross-sectional view of the regulator valve of the gas regulator of FIG. 4.

FIGS. 4 and 5 depict a gas regulator 110 constructed in accordance with one embodiment of the present invention. The gas regulator 110 generally comprises an actuator 112 and a regulator valve 114. The regulator valve 114 includes an inlet 116 for receiving gas from a gas distribution system, for example, and an outlet 118 for delivering gas to a facility having one or more appliances, for example. The actuator 112 is coupled to the regulator valve 114 and includes a control assembly 120 having a control element, such as a valve disc 122. During a first or normal operational mode, the control assembly 120 senses the pressure at the outlet 118 of the regulator valve 114, i.e., the outlet pressure, and controls a position of the valve disc 122 such that the outlet pressure approximately equals a predetermined setpoint or control pressure. Additionally, upon the occurrence of a failure in the system, the regulator 110 performs a relief function that is generally similar to the relief function described above with reference to the regulator 10 depicted in FIGS. 1 and 2.

With continued reference to FIG. 4, the regulator valve 114 defines a throat 124 and a valve mouth 126. The throat 124 is disposed between the inlet 116 and the outlet 118, and has a valve port 128 disposed therein. Gas must travel through the valve port 128 to travel between the inlet 116 and the outlet 118 of the regulator valve 114. The valve port 128 is removable from the regulator valve 114 such that it may be replaced with a different valve port having a bore of a different diameter or configuration to tailor operational and flow characteristics of the regulator valve 114 to a specific application. In the disclosed embodiment, the valve mouth 126 defines an opening disposed along an axis that is generally perpendicular to an axis of the inlet 116 and outlet 118 of the regulator valve 114.

The actuator 112 includes a housing 130 and the control assembly 120, as mentioned above. The housing 130 includes an upper housing component 130a and a lower housing component 130b secured together with a plurality of fasteners, for example. The lower housing component 130b defines a control cavity 132 and an actuator mouth 134. The actuator mouth 134 is connected to the valve mouth 126 of the regulator valve 114 to provide fluid communication between the actuator 112 and the regulator valve 114. The upper housing component 130a defines a relief cavity 136 and an exhaust port 138. The upper housing component 130a further defines a tower portion 140 for accommodating a portion of the control assembly 120, as will be described.

The control assembly 120 includes a diaphragm subassembly 142, a disc and balancing subassembly 144, and a release valve 146. The diaphragm subassembly 142 includes a diaphragm 148, a piston 150, a control spring 152, a relief spring 154, a combination spring seat 156, a relief spring seat 158, a control spring seat 160, and a piston guide 162.

More particularly, the diaphragm 148 includes a disc-shaped diaphragm defining an opening through a central portion thereof. The diaphragm 148 is constructed of a flexible, substantially air-tight, material and its periphery is sealingly secured between the upper and lower housing components 130a, 130b of the housing 130. The diaphragm 148 therefore separates the relief cavity 136 from the control cavity 132.

The combination spring seat 156 is disposed on top of the diaphragm 148 and defines an opening disposed concentric with the opening in the diaphragm 148. As depicted in FIG. 4, the combination spring seat 156 supports the control spring 152 and the relief spring 154.

The piston 150 of the disclosed embodiment includes a generally elongated rod-shaped member having a sealing cup portion 164, a yoke 166, a threaded portion 168, and a guide portion 170. The sealing cup portion 164 is concaved and generally disc-shaped and extends circumferentially about a mid-portion of the piston 150, and is located just below the diaphragm 148. The yoke 166 includes a cavity adapted to accommodate a coupler 172 which connects to a portion of the disc and balancing subassembly 144 to enable attachment between the diaphragm subassembly 142 and the disc and balancing subassembly 144, as will be described.

The guide portion 170 and the threaded portion 168 of the piston 150 are disposed through the openings in the diaphragm 148 and the combination spring seat 156, respectively. The guide portion 170 of the piston 150 is slidably disposed in a cavity in the piston guide 162, which maintains the axial alignment of the piston 150 relative to the remainder of the control assembly 120. The relief spring 154, the relief spring seat 158, and a nut 174 are disposed on the threaded portion 170 of the piston 150. The nut 174 retains the relief spring 154 between the combination spring seat 156 and the relief spring seat 158. The control spring 152 is disposed on top of the combination spring seat 156, as mentioned, and within the tower portion 140 of the upper housing component 130a. The control spring seat 160 is threaded into the tower portion 140 and compresses the control spring 152 against the combination spring seat 156. In the disclosed embodiment, the control spring 152 and the relief spring 154 include compression coil springs. Accordingly, the control spring 152 is grounded against the upper housing component 130a and applies a downward force to the combination spring seat 156 and the diaphragm 148. The relief spring 154 is grounded against the combination spring seat 156 and applies an upward force to the relief spring seat 158, which in turn is applied to the piston 150. In the disclosed embodiment, the force generated by the control spring 152 is adjustable by adjusting the position of the control spring seat 160 in the tower portion 140, and therefore the control pressure of the regulator 110 is also adjustable.

The control spring 152 acts against the pressure in the control cavity 132, which is sensed by the diaphragm 148. As stated, this pressure is the same pressure as that which exists at the outlet 118 of the regulator valve 114. Accordingly, the force applied by the control spring 152 sets the outlet pressure to a desired setpoint or control pressure for the regulator 110. The diaphragm subassembly 142 is operably coupled to the disc and balancing subassembly 144, as mentioned above, via the yoke 166 of the piston 150 and the coupler 172, and by a control arm 176.

The disc and balancing subassembly 144 includes an actuator stem 178 that is engaged by the control arm 176 to move the valve disc 122 between the open and closed positions as the diaphragm 148 flexes due to variations in the downstream pressure. Specifically, the actuator stem 178 is a generally linear rod having an end surface engaged by the control arm 176. The control arm 176 is a slightly curved rod and includes a fulcrum end 176a and a free end 176b. The fulcrum end 176a is pivotally coupled to the lower housing component 130b and includes a finger 180 having a rounded end and engaging the end surface of the actuator stem 178. The free end 176b is received between a top portion and a pin of the coupler 172 that is attached to the yoke 166 of the piston 150. Thus, the coupler 172 and the control arm 176 operably connect the disc and balancing subassembly 144 to the diaphragm subassembly 142.

The valve disc 122 of the disc and balancing subassembly 144 is operatively connected to the actuator stem 178, and includes a sealing insert 182 that engages the outlet of the valve port 128 to cut off the fluid flow through the regulator valve 114. The valve disc 122 is connected to the actuator stem 178 by a balanced port stem 184 and a balancing spring seat 186, and the combined elements are supported for linear movement by a stem guide 188, a retainer plate 190, a balancing diaphragm retainer 192 and a balancing port housing 194. The stem guide 188 is configured to fit within the actuator mouth 134, and includes a generally cylindrical inner portion that slidably retains the actuator stem 178. The stem guide 188 further includes channels 196 therethrough forming a portion of the path placing the outlet 118 in fluid communication with control cavity 132 as discussed further below.

The stem guide 188 engages the retainer plate 190, which is disposed between the stem guide 188 and balanced port housing 194, to hold the retainer plate 190 and balanced port housing 194 in place within the valve mouth 126. The retainer plate 190 is generally circular and includes a central opening through which the balanced port stem 184 passes. The balanced port housing 194 is generally cylindrical and hollow, extends toward the valve port 128, and has an inner diameter sized to slidably receive the valve disc 122. The diaphragm retainer 206 is disposed within the balanced port housing 194 and the opening of the retainer plate 190, and is held in place between a surface of the retainer plate 190 and an inner shoulder of the balanced port housing 194. A disc-shaped balancing diaphragm 198 having a central opening is provided within the balanced port housing 194. The balancing diaphragm 198 is constructed of a flexible, substantially airtight, material and its periphery is secured between the diaphragm retainer 192 and the balanced port housing 194. The inner edge at the central opening of the balancing diaphragm 198 is sealingly secured between the valve disc 122 and the balanced port stem 184. The valve disc 122, balanced port stem 184 and the actuator stem 178 are biased toward the open position of the regulator valve 114 by a balancing spring 200 disposed between the spring seat 186 and a seating surface of the diaphragm retainer 192.

The balancing diaphragm 198 provides a force on the valve disc 122 in the direction of the valve port 128 to compensate for the force applied to the valve disc 122 due to the upstream pressure of the fluid passing through the valve port 128. The valve disc 122, balanced port stem 184 and diaphragm retainer 192 are configured to provide passages placing the surface of the balancing diaphragm 198 opposite the valve port 128 in fluid communication with the upstream pressure bearing on the valve disc 122. The components of the disc and balancing subassembly 144 are configured so that the force applied by the balancing diaphragm 198 is approximately opposite and equal to the force of the upstream pressure on the valve disc 122 to eliminate any influence of the upstream pressure on the diaphragm subassembly 142 and thereby allowing for more accurate control of the downstream pressure by the gas regulator 110.

In the illustrated embodiment, the regulator 110 also includes a secondary device in the form of an overpressure monitor 212 that operates to cut off the fluid flow through the regulator valve 114 in an overpressure situation until the downstream pressure is reduced after a failure of the actuator 112. The monitor 212 in the illustrated embodiment has a similar configuration as the actuator 112, and the same reference numerals with the leading "1" replaced by a leading "2" are used to refer to the corresponding elements of the monitor 212. The monitor 212 also operates in a similar manner as the actuator 112, with relevant differences being discussed further hereinafter.

Because the monitor 212 only responds in the event that the downstream pressure exceeds a cutoff pressure established by the diaphragm 248 and the control spring 252, the monitor diaphragm subassembly 242 and disc and balancing subassembly 244 are configured accordingly. A balancing spring 300 disposed between the spring seat 286 and the diaphragm retainer 292 biases the valve disc 22 to the normal open position as shown in FIGS. 4 and 5. The coupler 272 and control arm 276 are configured so that the coupler 272 only drives the control arm 276 in the direction to move the valve disc 222 toward the closed position and into engagement with the upstream side of the valve port 128 to cut off the fluid flow through the regulator valve 114. A pin 272a of the coupler 272 engages the free end 276b of the control arm 276 to rotate the control arm 276 when the diaphragm 248 and piston 250 move upward due to a downstream pressure exceeding the cutoff pressure. Conversely, a top portion 272a of the coupler 272 is disposed remotely from the control arm 276 so the downward movement of the diaphragm 248 and piston 250 caused by decreases in the downstream pressure do not cause movement of the control arm 276. Of course, alternate configurations of overpressure monitors are know to those skilled in the art, including monitors configured to close when the downstream pressure drops below a low pressure cutoff, and are contemplated by the inventors as having use in gas regulators in accordance with the present disclosure.

The disc and balancing subassembly 244 has a different configuration of components, but functions in a similar manner as the subassembly 144 of the actuator 112. A monitor mouth and balance port housing are combined in a coupling module 294 that connects the monitor 212 to a second valve mouth 226 of the regulator valve 114 disposed opposite the actuator 112 and on an upstream side of the valve port 128. The module 294 has an inner diameter sized to slidably receive the valve disc 222. The balancing diaphragm 298 is secured between the diaphragm retainer 292 and the balanced port housing 294 at the outer edge, and the inner edge at the central opening of the balancing diaphragm 298 is sealingly secured between the valve disc 222 and the balanced port stem 284. The valve disc 222, balanced port stem 284 and diaphragm retainer 292 are configured to provide passages placing the surface of the balancing diaphragm 298 opposite the valve port 128 in fluid communication with the upstream pressure bearing on the valve disc 222 to balance the force applied to the valve disc 222 by the upstream pressure.

Figure 1:
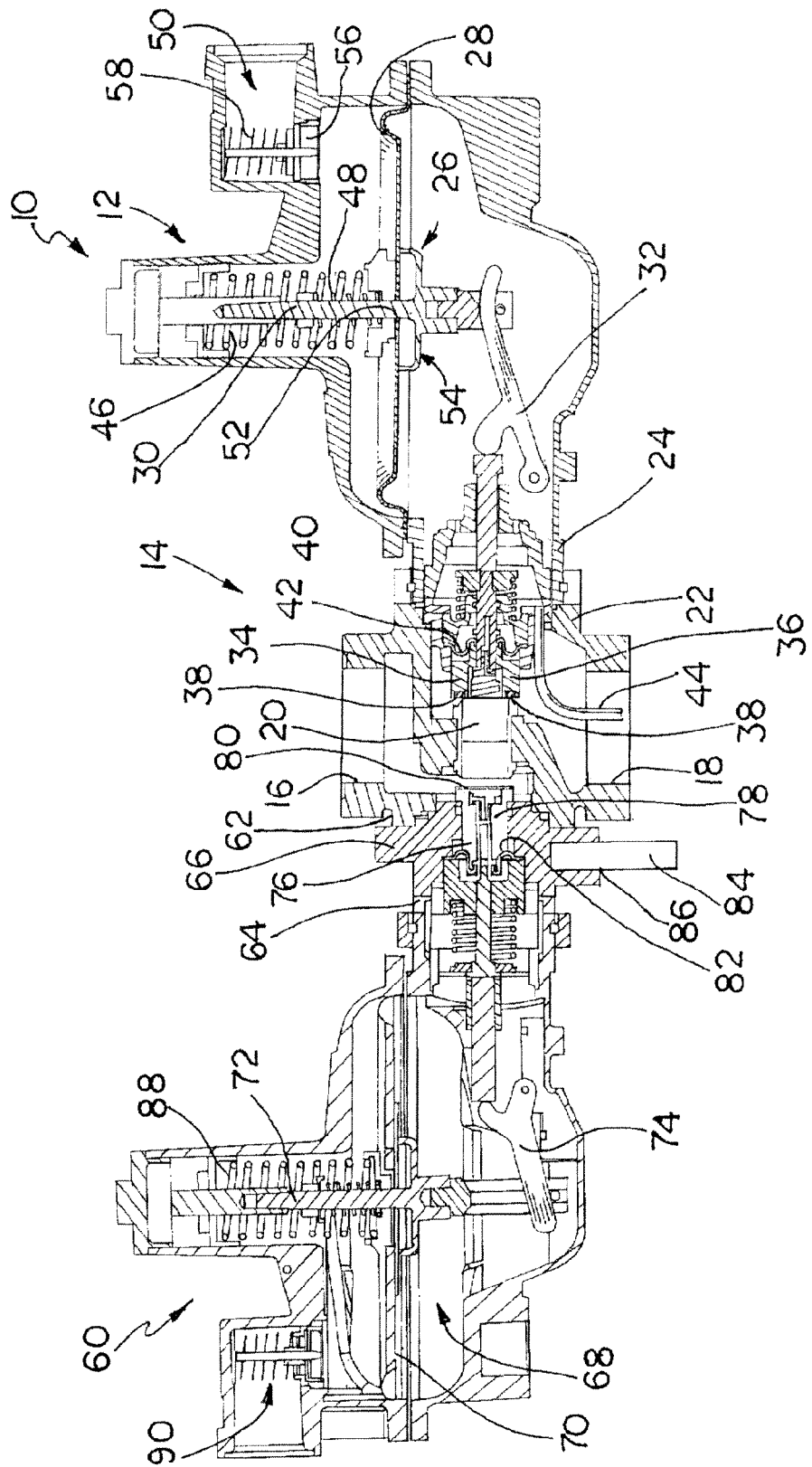
FIG. 1 is a side cross-sectional view of a conventional gas regulator having an actuator and an overpressure monitor in a closed position.
Figure 2:
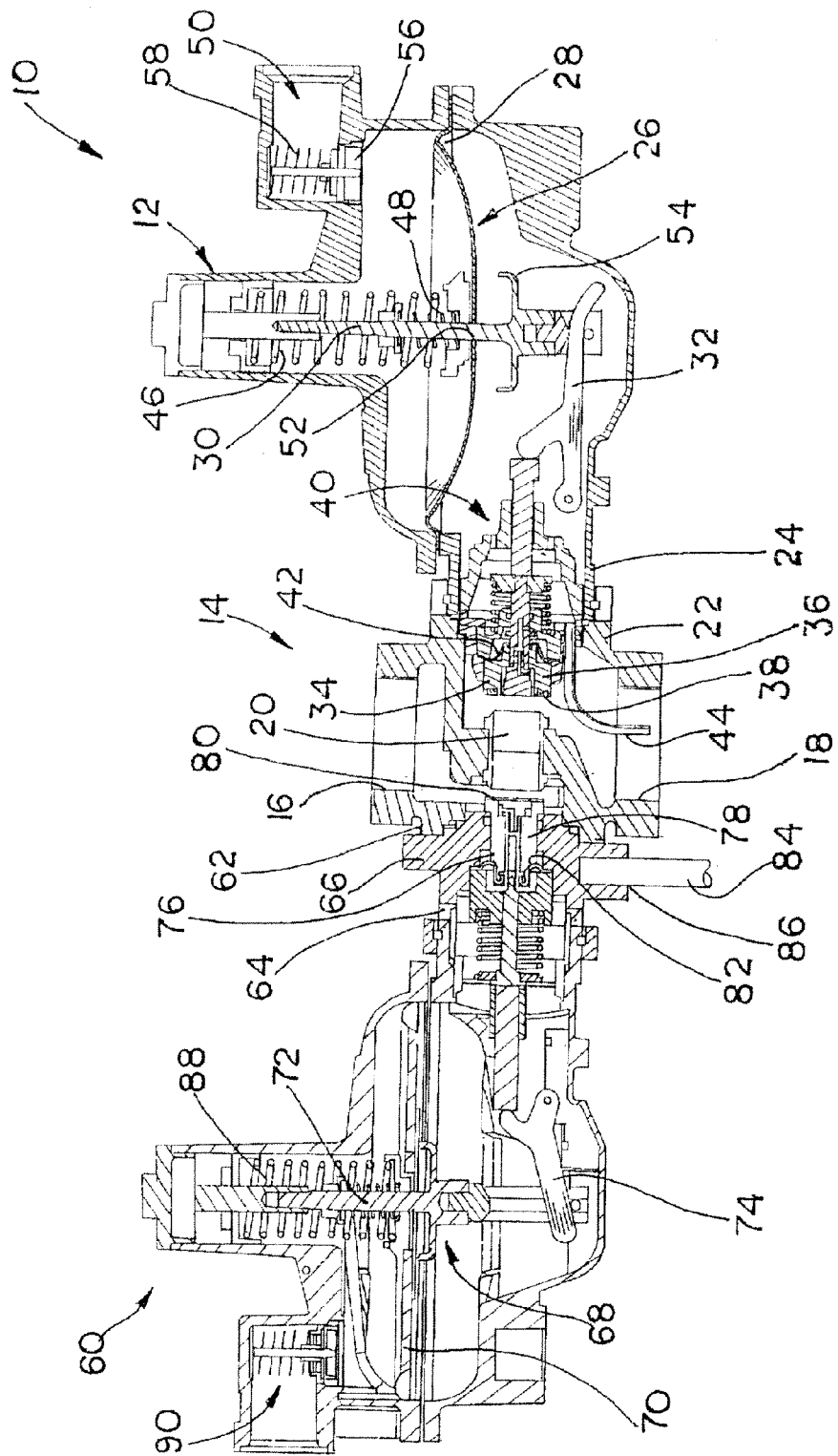
FIG. 2 is a side cross-sectional view of the gas regulator of FIG. 1 in a full open position.
Figure 3:
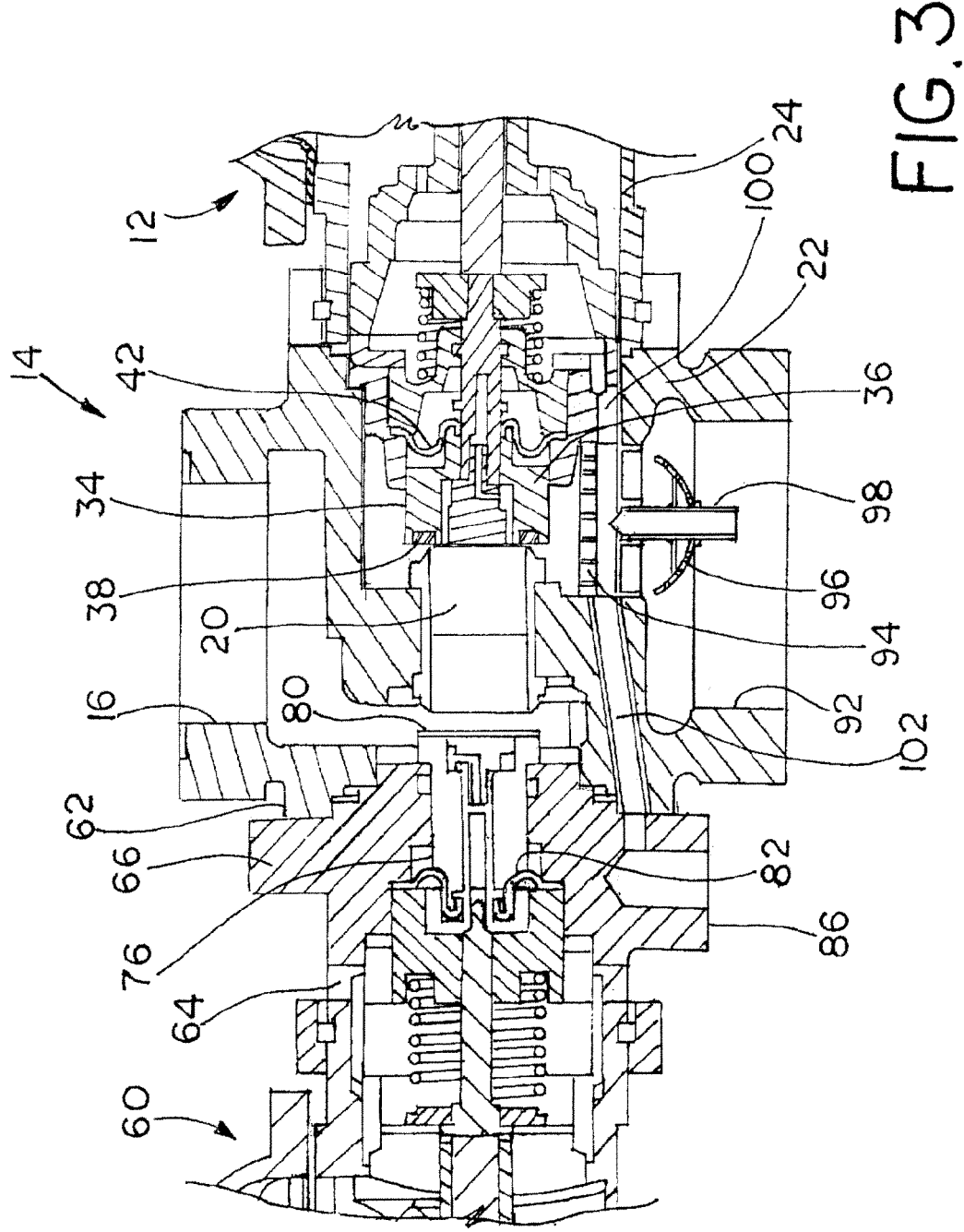
FIG. 3 is a side cross-sectional view of a gas regulator having a flow conditioning subassembly in a full open position.

The monitor 212 of FIGS. 4 and 5 is reconfigured from the monitor 60 of FIGS. 1 and 2 to facilitate dual sensing of the downstream pressure at both the actuator 112 and the monitor 212 using a pressure measurement obtained within the gas regulator 110 at the outlet 118. The port 86 receiving the downstream pressure feedback line 84 may be eliminated such that the external feedback line 84 is no longer necessary. In this embodiment, a Pitot tube 302 having a sensing point within the outlet 118 of the regulator valve 114 provides the downstream pressure feedback to both the actuator 112 and the monitor 212. The Pitot tube 302 extends inwardly toward the valve port 128 and has a first branch 304 splitting off from a main branch of the Pitot tube 302 and into the valve mouth 126. The actuator branch 304 passes through passages or openings 306, 308 (See FIG. 5) through the balanced port housing 194 and the retainer plate 190, respectively. Once through the actuator branch 304 and the openings 306, 308, the downstream pressure is communicated through the channels 196 to the control cavity 132.

In addition to the actuator branch 304, a second branch 310 splits off from the main branch of the Pitot tube 302 in the direction of the monitor 212. In the illustrated embodiment, the monitor branch 310 extends to a passage or channel 312 through the wall of the regulator valve 114 proximate the outlet 118. The regulator valve passage 312 extends through the wall of the regulator valve 114 and aligns with an outer opening of a corresponding passage or channel 314 through the wall of the coupling module 294. The coupling module passage 314 similarly extends through the wall of the coupling module 294 and into the exterior of the monitor housing 230. Once through the monitor branch 310 and the passages 312, 314, the downstream pressure is communicated through the disc and balancing subassembly 244 to the control cavity 232 of the monitor 214.

When an operating demand is placed on the gas distribution system, e.g., a user begins operating an appliance such as a furnace, a stove, etc., the appliance draws gas from the outlet 118 and correspondingly the control cavity 132 of the actuator 112 and the control cavity 232 of the monitor 212, thereby reducing the pressure that is sensed by the diaphragms 148, 248. As the pressure sensed by the diaphragm 148 decreases, a force imbalance occurs between a control spring force and an outlet pressure force on the diaphragm 148 such that the control spring 152 expands and displaces the diaphragm 148 and piston 150 downward relative to the housing 130. This causes the control arm 176 to pivot in the clockwise direction, which in turn rotates the finger 180 relative to the surface of the actuator stem 178. This allows the actuator stem 178 and the valve disc 122 to move away from the outlet 124 of the valve port 128 due to the force of the balancing spring 200 to open the regulator valve 114. At the same time, the pressure decrease may also cause a force imbalance to occur between a control spring force and an outlet pressure force on the diaphragm 248 such that the control spring 252 expands and displaces the diaphragm 248 and piston 250 downward relative to the housing 230. However, because the upper portion of the coupler 272 is disposed remotely from the control arm 276, the monitor 212 does not similarly respond to the drop in pressure with movement of the valve disc 222.

When the demand is removed from the gas distribution system, such as when the user shuts off the appliance, the regulator 110 initially responds by decreasing the fluid flow through the regulator valve 114. As gas continues to flow through the valve port 128 and to the downstream portion of the system, the pressure increases at the outlet 118 and, correspondingly, in the control cavity 132 of the actuator 112 and the control cavity 232 of the monitor 212. As the pressure sensed by the diaphragm 148 increases and overcomes the control spring force, the diaphragm 148 and piston 150 are forced upward relative to the housing 130. The upward movement causes the control arm 176 to pivot in the counterclockwise direction, which in turn drives the actuator stem 178 and the valve disc 122 toward the valve port 128 to reduce the fluid flow through the regulator valve 114. Under normal operating conditions, the outlet pressure will drop to approximately the actuator setpoint pressure and remain there until the downstream demand changes in a manner that causes a response from by the actuator 112.

The monitor cutoff pressure is greater than the actuator setpoint pressure, and the monitor 212 does not typically respond to pressure variations within the normal operating range of the regulator 110. In the event of a failure of the actuator 112 such as, for example, the rupturing of the diaphragm 148, the valve disc 122 may remain open despite increases in the downstream pressure beyond the actuator setpoint pressure. Eventually, the pressure at the sensing point of the Pitot tube 302 reaches the cutoff pressure of the monitor 212. The downstream pressure communicated to the control cavity 232 by the monitor branch 310 causes a force imbalance to occur between the control spring force and the outlet pressure force on the diaphragm 248 such that the control spring 252 contracts and displaces the diaphragm 248 and piston 250 upward relative to the housing 230. When the piston 250 moves, the pin 272a of the coupler 272 rotates the control arm 276 to drive the actuator 278 and move the valve disc 222 into engagement with the valve port 128 to shut off the fluid flow through the regulator valve 114. The monitor 212 will continue to stop the fluid flow as long as the pressure at the sensing point of the Pitot tube 302 remains above the monitor cutoff pressure.

With the valve disc 122 disengaged from the outlet 124 of the valve port 128, the gas flows into the second portion 236 of the balanced port housing 194. Due to the configurations of the inner surface of the second portion 236, the valve disc 122 and the opening 242, the fluid is forced through the opening 242 and the baffles 244 disposed therein with relatively little divergence form the flow path. As the fluid passes through the baffles 244, turbulent fluid flow, to the extent any turbulence is present, is converted to laminar flow. Consequently, when the fluid reaches the outlet 118 of the regulator valve 114 and the sensing point of the Pitot tube 302, the smooth flow of the fluid allows for improved measurement of the downstream pressure and, correspondingly, improved regulation of the downstream pressure by the control assembly 120.

Figure 6:
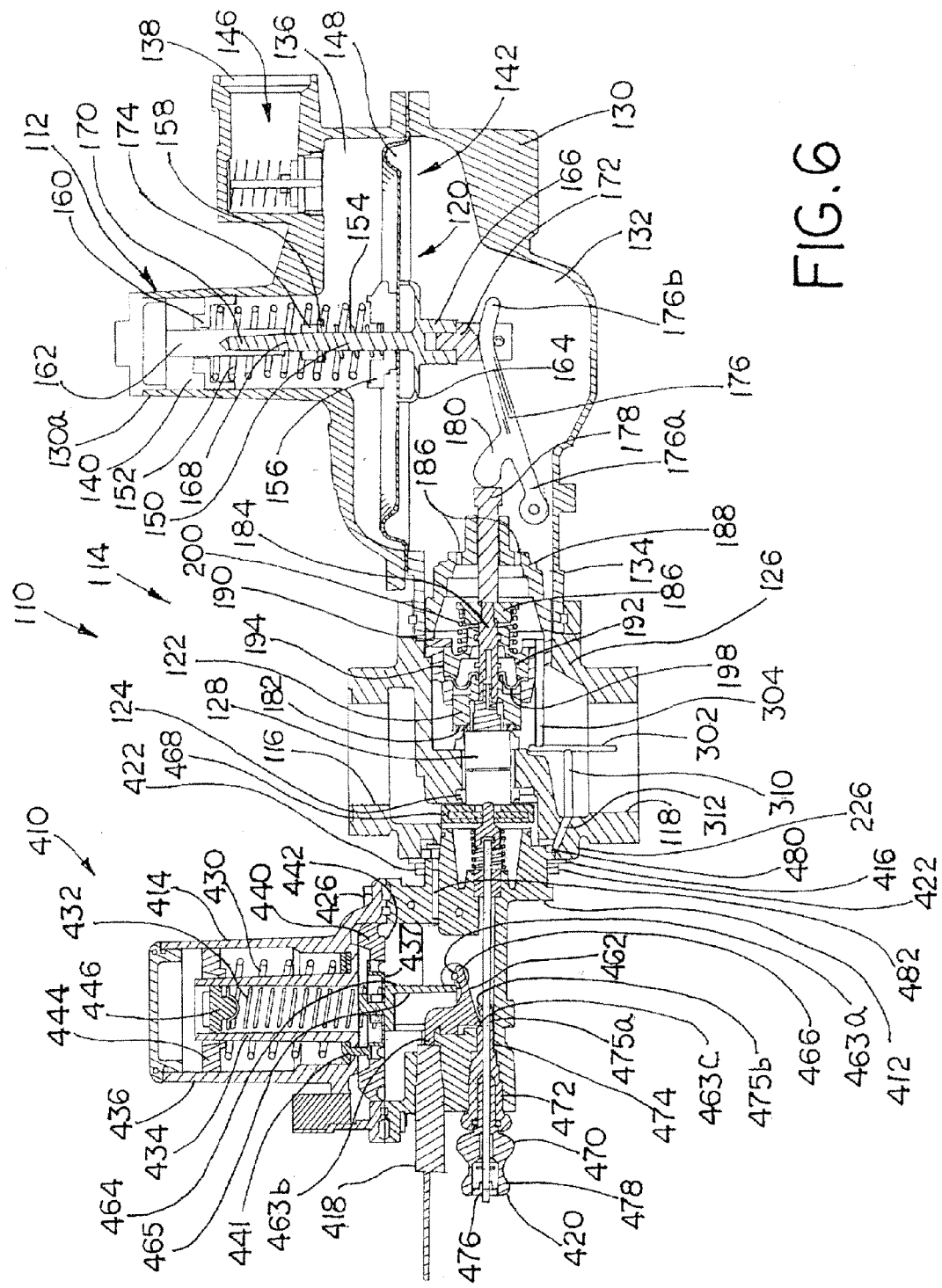
FIG. 6 is a side cross-sectional view of a gas regulator having dual pressure sensing for the actuator and a slam shut safety device in accordance with the present disclosure with the slam shut device in the shut position.

As mentioned above, the monitor 212 is but one type of secondary devices that may be used with regulators 110. FIG. 6 illustrates a slam shut safety device 410 implemented with the regulator 110 and configured for dual sensing in accordance with the present disclosure as provided by the Pitot tube 302. The slam shut safety device may be generally similar to the device illustrated and described in U.S. Pat. Publ. No. 2008/0257420, which is expressly incorporated by reference herein. The slam shut safety device 410 may be attached to the main regulator 110 at the regulator valve 114 on the upstream side of the valve port 128. The slam shut safety device 410 includes a valve body 412, an upper case 414 attached to the valve body, a snap ring flange 416 mounted to one side of the valve body 412, a limit switch 418, and a reset pin 420 protruding from the valve body. The slam shut safety device 410 is attached to the regulator valve 114 via fasteners 422. Likewise, the upper case 414 is attached to the valve body 412 with fasteners 426. The fasteners 422, 426 may be bolts, rivets, screws, or virtually any other type of fastener appropriate for attaching one component to another component.

Figure 7:
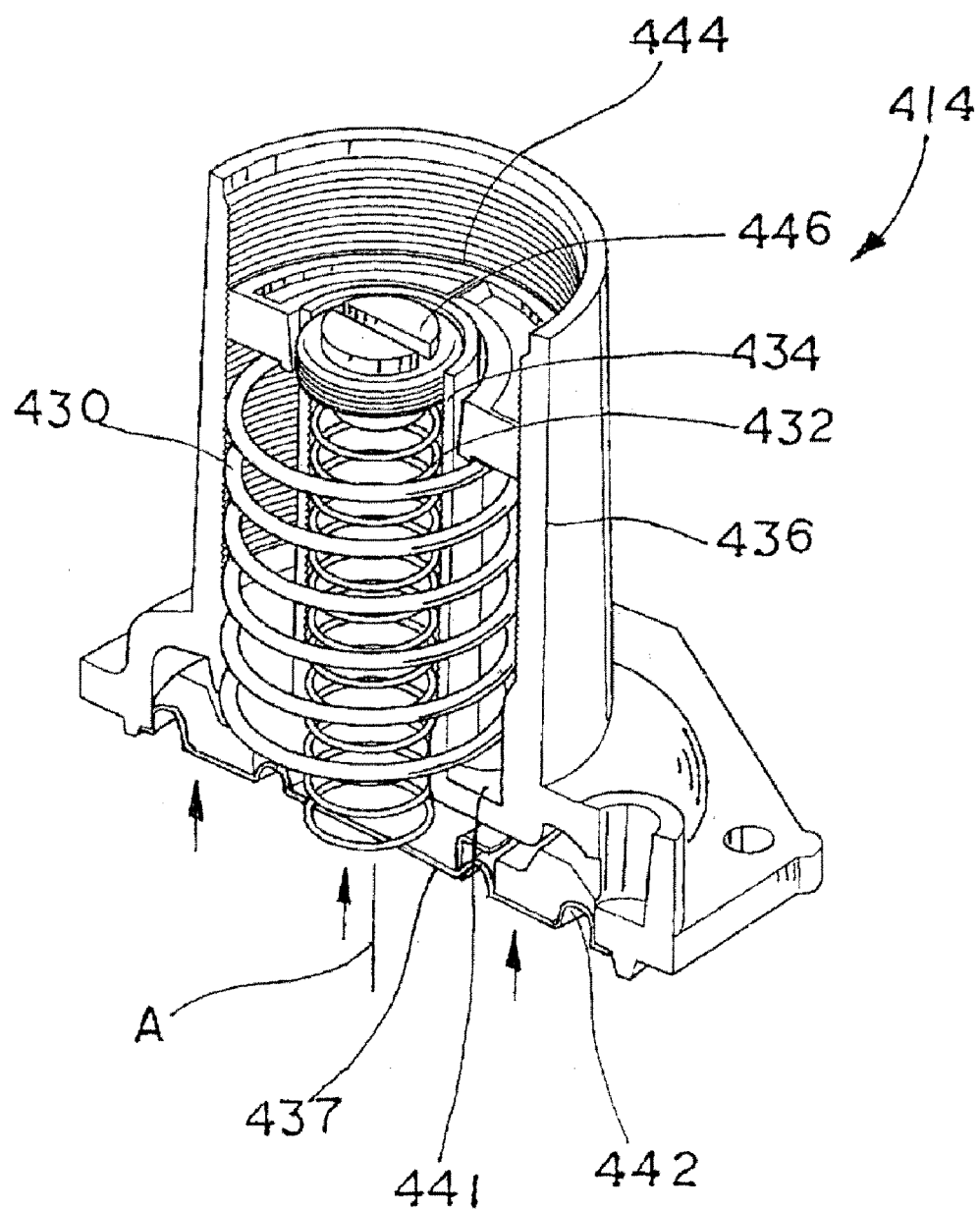
FIG. 7 is a cutaway view of an upper case of the slam shut safety device shown in FIG. 6.

The upper case 414 (FIG. 7) houses an overpressure spring 430 and an underpressure spring 432. The underpressure spring 432 determines the lower (minimum) acceptable gas pressure in the gas distribution system. Similarly, the overpressure spring 430 determines the upper (maximum) acceptable gas pressure in the gas distribution system. Both the overpressure and underpressure springs 430, 432 are disposed within the upper case 414 in a generally co-axial configuration (i.e., central axes of the two springs are co-located). However, the springs need not be axially co-located and the springs may be axially offset from one another. An inner casting tube 434 separates the overpressure spring 430 from the underpressure spring 432. An outer casting tube 436 surrounds the overpressure spring 430 and protects both the overpressure spring 430 and the underpressure spring 432 from environmental factors. The underpressure spring 432 is coupled at one end to a diaphragm plate 437, and the overpressure spring is coupled at one end to an overpressure ring 441. The overpressure ring 441 may be coupled to the diaphragm plate 437. Both the diaphragm plate 437 and the overpressure ring 441 may be attached to a diaphragm 442, which will be discussed in further detail below. The diaphragm 442 is exposed on one side to system pressure as will be discussed further below, and on another side the diaphragm 442 is exposed to spring forces from the overpressure spring 430 and the underpressure spring 432. A portion of the diaphragm 442 is movable and displaceable into an interior portion of the valve body 412 or the upper case 414, depending on system pressure along axis A. Axis A is substantially parallel to or with coaxial with the central axes of the overpressure spring 430 and the underpressure spring 432.

At ends opposite the diaphragm 442, the overpressure spring 430 and the underpressure spring 432 contact or are seated against an overpressure adjustment cap 444 and an underpressure adjustment cap 446, respectively. The overpressure adjustment cap 444 and the underpressure adjustment cap 446 are displaceable along axis A towards and away from the diaphragm 442. In one embodiment, the overpressure adjustment cap 444 and the underpressure adjustment cap 446 may be threadedly engaged with the outer and inner casting tubes 436, 434, respectively. In particular, the overpressure cap 444 may be threadedly engaged to either an inner surface of the outer casting tube 436, or an outer surface of the inner casting tube 434. The underpressure cap 446 may be threadedly engaged with an inner surface of the inner casting tube 434. Both the underpressure cap 446 and the overpressure cap 444 are movable along axis A to adjust spring tension of the overpressure spring 430 and the underpressure spring 432 on the diaphragm plate 437. The distance between the adjustment caps 444, 446 and the diaphragm plate 437 determines the overpressure and underpressure set points for the slam shut safety device 410. Locating both the overpressure spring 430 and the underpressure spring 432 on the same side of the diaphragm 442 facilitates adjustment of both the overpressure spring 430 and the underpressure spring 432 from outside of the valve, and adjustments to the overpressure spring 430 and the underpressure spring 432 may be made independently of one another.

Figure 8A:
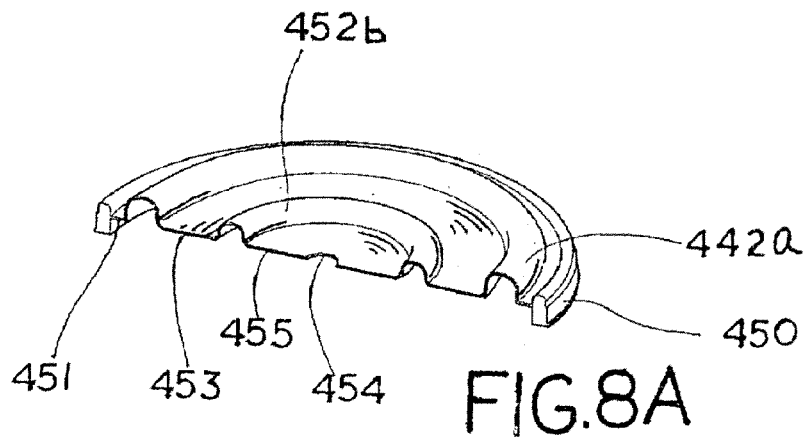
FIG. 8A is a sectional view of a diaphragm that is disposed between the upper case and the valve body of the slam shut safety device of FIG. 6.
Figure 8B:
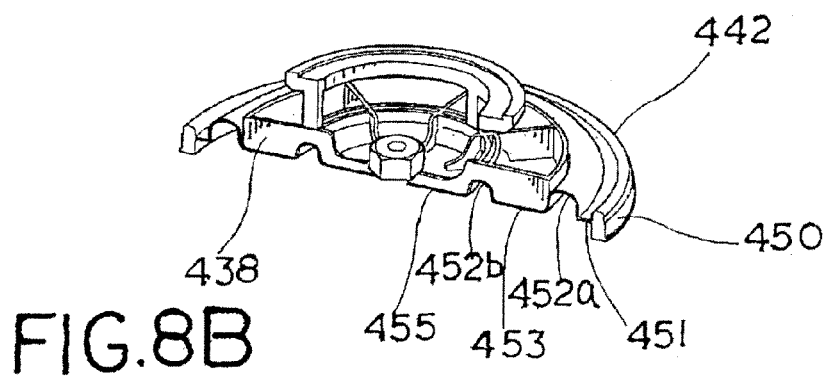
FIG. 8B is a sectional view of the diaphragm of FIG. 8A in a low pressure configuration.
Figure 8C:
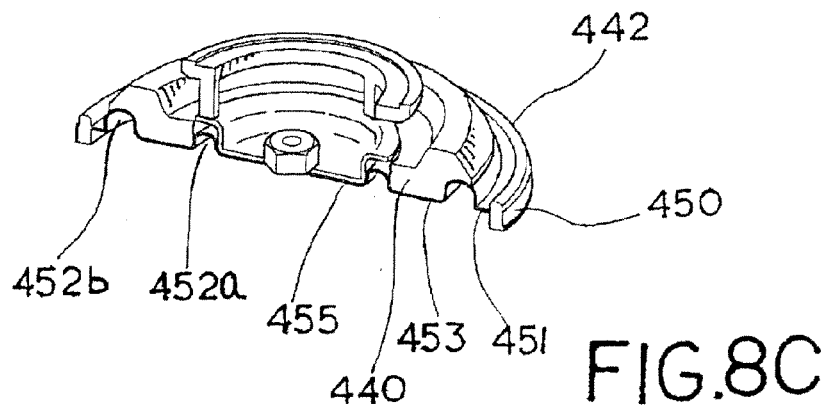
FIG. 8C is a sectional view of the diaphragm of FIG. 8A in a high pressure configuration.

The diaphragm 442 (FIGS. 8A, 8B, 8C) includes an outer o-ring 450 for sealing the upper case 414 with the valve body 412. The diaphragm 442 also includes first and second concentric convolutions 452a and 452b. Separating the o-ring 450 and the first convolution 452a is an outer planar region 451. Separating the first convolution 452a and the second convolution 452b is a middle planar region 453, and separating the second convolution 452b and a central opening 454 is an inner planar region 455. The first and second convolutions 452a, 452b allow a single diaphragm 442 to be used in both a low pressure configuration and a high pressure configuration. The low pressure configuration is shown in FIG. 8B and the high pressure configuration is shown in FIG. 8C. The central opening 454 may receive a fastener (such as a bolt) when attaching the diaphragm 442 to the diaphragm plate 437.

The low pressure configuration includes a low pressure diaphragm plate 438, which is a rigid plate that covers the inner convolution 452b, the inner planar region 455, and the middle planar region 453 (FIG. 8B), while allowing the outer convolution 452a and the outer planar region 451 to remain movable. Likewise, the high pressure configuration includes a high pressure diaphragm plate 440, which is a rigid plate the covers the outer convolution 452a and the middle planar region 453 (FIG. 8C), while allowing the inner convolution 452b, the inner planar region 455 and the outer planar region 451 to remain movable. In this manner, the low pressure diaphragm plate 438 and the high pressure diaphragm plate 440 determine which part of the diaphragm 442 remains movable and which part of the diaphragm is prevented from moving.

Turning again to FIG. 6, the valve body 412 includes the limit switch 418 that is attached to a rotatable cam 462, the cam 462 including three cam arms 463a, 463b, 463c. The cam 462 is connected to the diaphragm 442 via a plunger 464 at the first cam arm 463a. The plunger 464 includes a plunger arm 465 extending downward. The plunger arm 465 is connected to the cam 462 at a connection point 466 on the first cam arm 463a that is offset from a pivot axis of the cam 462. As the plunger 464 moves upward in response to an overpressure condition which is strong enough to overcome the force produced by the overpressure spring 430, the cam 462 rotates counterclockwise (in this embodiment). As the cam 462 rotates, a latch connected to the first cam arm 463a is released and the slam shut plug 468 moves to a closed position against the valve port 128 as shown, thereby shutting off the gas supply to the main regulator. In response to an underpressure condition, in which the spring force of the underpressure spring 432 overcomes the system gas pressure, the plunger 464 moves downward causing the cam 462 to rotate in a clockwise direction. After a predetermined amount of rotation, the latch connected to the first cam arm 463a is released and the slam shut plug 468 moves to the closed position shutting off the gas supply to the main regulator. The limit switch 418 detects movement of the diaphragm 442 through rotation of the cam 462 because the limit switch 418 is directly linked to the cam 462 by the second cam arm 462b, which is linked to the diaphragm 442 by the cam 462 and the plunger 464. In this manner, the limit switch 418 moves longitudinally in response to small variations in pressure, thus detecting diaphragm 442 movement, even if a reset pin assembly 470 is damaged.

Figure 9A:
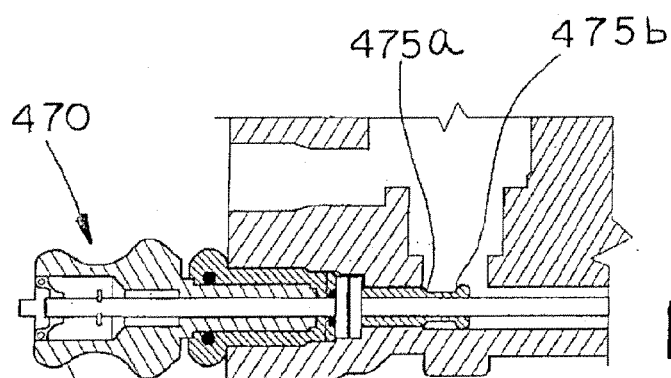
FIG. 9A is a cutaway elevational view of the valve body of the slam shut safety device of FIG. 6, specifically highlighting a reset pin in a reset position.
Figure 9B:
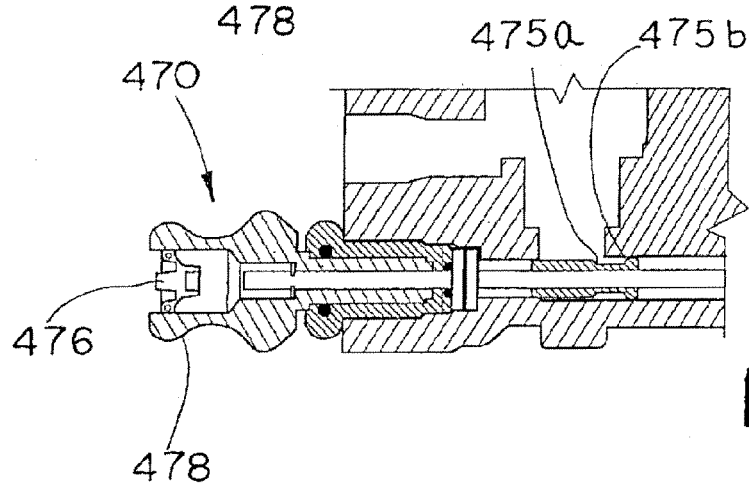

The valve body 412 also includes the reset pin assembly 470 for relatching the cam 462. The reset pin assembly 470 includes a reset rod 472, a relatch plug 474, a travel indicator 476 (FIGS. 9A, 9B), and a reset sleeve 478. The reset rod 472 is slidable in the reset sleeve 478 in response to an interaction between the relatch plug 474 and the cam 462 at the third cam arm 463c. As the cam 462 rotates in response to movement of the diaphragm 442, the third cam arm 463c contacts a first shoulder 475a of the relatch plug 474 and forces the relatch plug 474 outward (to the left in FIGS. 6, 9A, and 9B). This, in turn, moves the reset rod 472 outward, and the reset rod 4728 contacts the travel indicator 476 (FIGS. 9A and 9B). The travel indicator 476 may be formed of a resilient, deformable material. When the reset rod 472 contacts the travel indicator 476, a center portion of the travel indicator 476 is deformed outward (as shown in FIG. 9A), thereby producing a visual and tactile indication that the cam 462 has rotated in response to an over or underpressure condition. The travel indicator 476 provides protection from water or other environmental factors by forming a seal between within the reset sleeve 474, thereby protecting the reset rod 468.

Once the over/underpressure condition is corrected, the reset pin assembly 470 may be used to relatch the cam 462. A user may displace one end of the reset rod 472 (the end disposed in the travel indicator) towards the interior of the valve body 412. In doing so, the relatch plug 474 may also be displaced and a second shoulder 475b of the relatch plug 474 may contact the third cam arm 463c, thereby forcing the cam 462 to rotate into the relatched position.

Dual sensing of the downstream pressure at both the actuator 112 and the slam shut safety device 410 may be achieved in a similar manner as discussed above in connection with the monitor 212. The Pitot tube 302 may have a similar configuration with the actuator branch 304 extending into the valve mouth 126 and the second branch 310 splitting off from the Pitot tube 302 in the direction of the secondary device, in this case the slam shut safety device 410. In this embodiment, the passage or channel 312 through the wall of the regulator valve 114 may be configured to align with an outer opening of a corresponding passage or channel 480 through the wall of the valve body 412 of the slam shut safety device 410. The channel 480 may extend through the valve body 412 to the interior of the device 410 to place the sensing point of the Pitot tube 302 in fluid communication with the interior of the device 410, or the channel 480 may be part of or extend to an upper passage or channel 482 of the valve body 412 that in turn places the interior of the device 410 in fluid communication with the sensing point.

With the illustrated configuration, the actuator 112 and the slam shut safety device 410 both sense the same outlet pressure from the outlet 118 of the regulator valve 114. Unlike the monitor 212 described above, the slam shut safety device 410 remains set in the open position with the slam shut plug 468 in the open position (not shown) disposed away from the valve port 128 during normal operation of the regulator 110 and under normal downstream pressures as sensed by the Pitot tube 302. However, when the downstream pressure at the outlet 118 outside the pressure limits or the device 410, the device 410 is triggered and the slam shut plug 468 engages the valve port 128 to cut off the flow of gas through the regulator valve 114. Consequently, in the event of an overpressure situation caused by a failure within the mechanism of the actuator 112 (e.g., punctured diaphragm 148, broken control arm 176, etc.), the pressure at the outlet 118 may exceed the setpoint pressure of the overpressure spring 430 and cause the cam 462 to rotate counterclockwise, release the latch and allow the slam shut plug 468 to move to the closed position. Conversely, during an underpressure condition caused by, for example, a rupture in a downstream gas line, the pressure at the outlet 118 may drop below the lower setpoint pressure of the underpressure spring 432 to allow the spring 432 to move the plunger 464 downward and rotate the cam 462 counterclockwise until the latch connected to the cam arm 463a releases to allow the slam shut plug 468 to move and engage the valve port 128.

The regulator 110 having internal dual downstream pressure sensing via the Pitot tube 302 disposed within the outlet 118 of the regulator valve 114 facilitates implementation in gas distribution systems without the necessity of downstream pressure feedback lines. By eliminating the external pressure feedback lines, installation of the regulator 110 is simplified to the attachment of the regulator valve 114 to the upstream and downstream piping. The feedback line and an associated downstream port are eliminated, which may be particularly advantageous where space is limited by the presence of other components of the system. The reduction in parts also reduces maintenance requirements and costs, and eliminates external lines that are susceptible to damage that can make the monitors inoperable. Additionally, the dual sensing of the Pitot tube 302 allows both the actuator 112 and the secondary device to sense the same pressure at the same location, thereby eliminating performance issues that can arise due to inconsistencies the pressures that may exists at two distinct pressure sensing locations. The internal dual pressure sensing regulator 110 in accordance with the present disclosure provides an alternative to previous regulators that is less expensive to implement and is readily implemented in a variety of regulator valve sizes and body types.

While the preceding text sets forth a detailed description of numerous different embodiments of the invention, it should be understood that the legal scope of the invention is defined by the words of the claims set forth at the end of a patent claiming priority hereto. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A fluid regulating device, comprising:
    a regulator valve having an inlet, an outlet, and a valve port disposed between the inlet and the outlet;
    an actuator coupled to the regulator valve and comprising an actuator valve disc, the actuator valve disc disposed within the regulator valve and adapted for displacement between a closed position engaging a downstream side of the valve port and an open position disposed away from the valve port;
    a secondary device coupled to the regulator valve and configured to sense an input pressure and to perform a responsive action if the sensed input pressure varies from a secondary device setpoint pressure;
    a Pitot tube having a first end with a sensing point disposed within the outlet of the regulator valve, a first branch extending toward the actuator, and a second branch extending toward the secondary device, wherein the first end and the first branch of the Pitot tube place the sensing point and the outlet in fluid communication with an interior of the actuator, wherein the first end and the second branch of the Pitot tube place the sensing point and the outlet in fluid communication with an interior of the secondary device, wherein the actuator is configured to cause the actuator valve disc to move toward the valve port when the pressure at the sensing point of the Pitot tube increases and to cause the actuator valve disc to move away from the valve port when the pressure at the sensing point decreases to maintain a pressure downstream of the fluid regulating device approximately equal to a regulator setpoint pressure, and wherein the pressure at the sensing point is the input pressure of the secondary device; and one of (a) through (c), as follows:
(a) wherein the secondary device comprises a slam shut safety device comprising a slam shut plug, the slam shut plug disposed within the regulator valve and adapted for displacement between a closed position engaging an upstream side of the valve port and an open position disposed away from the valve port, wherein the secondary device setpoint pressure is a maximum setpoint pressure that is greater than the regulator setpoint pressure, and wherein the responsive action of the slam shut safety device is causing the slam shut plug to engage the upstream side of the valve port to close the regulator valve and stop a fluid flow through the regulator valve when the pressure at the sensing point exceeds the maximum setpoint pressure, and wherein the slam shut safety device is configured so that the slam shut plug must be manually reset to the open position after slam shut plug moves to the closed position,
(b) wherein the secondary device comprises a slam shut safety device comprising a slam shut plug, the slam shut plug disposed within the regulator valve and adapted for displacement between a closed position engaging an upstream side of the valve port and an open position disposed away from the valve port, wherein the secondary device setpoint pressure is a minimum setpoint pressure that is less than the regulator setpoint pressure, and wherein the responsive action of the slam shut safety device is causing the slam shut plug to engage the upstream side of the valve port to close the regulator valve and stop a fluid flow through the regulator valve when the pressure at the sensing point falls below the minimum setpoint pressure, and wherein the slam shut safety device is configured so that the slam shut plug must be manually reset to the open position after slam shut plug moves to the closed position, and
(c) further comprising a cylindrical housing disposed in the regulator valve and having an inner diameter that is sized and configured to slidably receive the actuator valve disc when the valve disc moves between the open and closed positions, wherein the housing includes a passage therethrough to which the first branch of the Pitot tube is connected to place the sensing point of the Pitot tube in fluid communication with the interior of the actuator, wherein the actuator comprises an actuator stem operatively connected to the actuator valve disc to move the actuator valve disc between the open and the closed positions, and a stem guide disposed within an actuator mouth of actuator proximate the regulator valve and slidably engaging the actuator stem, wherein the stem guide includes channels therethrough such that the first branch of the Pitot tube, the passage of the housing and the channels of the stem guide place the sensing point of the Pitot tube in fluid communication with the interior of the actuator.

2. A fluid regulating device in accordance with claim 1, comprising an actuator balancing diaphragm operatively connected to the actuator valve disc and having a first side in fluid communication with an upstream pressure of fluid flowing through the valve port, wherein the upstream pressure applies a force to the actuator valve disc in the direction of the open position, and the upstream pressure acting on the first side of the actuator balancing diaphragm applies a force to the valve disc in the direction of the closed position and approximately equal to the force of the upstream pressure on the actuator valve disc.

3. A fluid regulating device in accordance with claim 1, wherein the secondary device comprises a monitoring device comprising a monitor valve disc, the monitor valve disc disposed within the regulator valve and adapted for displacement between a closed position engaging an upstream side of the valve port and an open position disposed away from the valve port, wherein the secondary device setpoint pressure is a monitor cutoff pressure that is greater than the regulator setpoint pressure, and wherein the responsive action of the monitoring device is causing the monitor valve disc to engage the upstream side of the valve port to close the regulator valve and stop a fluid flow through the regulator valve when the pressure at the sensing point exceeds the monitor cutoff pressure.

4. A fluid regulating device in accordance with claim 3, wherein the monitoring device comprises a monitor balancing diaphragm operatively connected to the monitor valve disc and having a first side in fluid communication with an upstream pressure of fluid flowing through the valve port, wherein the upstream pressure applies a force to the monitor valve disc in the direction of the open position, and the upstream pressure acting on the first side of the monitor balancing diaphragm applies a force to the valve disc in the direction of the closed position and approximately equal to the force of the upstream pressure on the monitor valve disc.

5. A fluid regulating device in accordance with claim 1, wherein the regulator valve has a passage therethrough proximate the outlet and the secondary device and having the second branch of the Pitot tube connected thereto, the fluid regulating device comprising a coupling module connecting the secondary device to the regulator valve and having a passage aligning with the passage of the regulator valve, wherein the second branch of the Pitot tube, the passage of the regulator valve and the passage of the coupling module place the sensing point in fluid communication with the interior of the secondary device.

6. In a fluid regulating device having a regulator valve having an inlet, an outlet, and a valve port disposed between the inlet and the outlet, an actuator coupled to the regulator valve and comprising an actuator valve disc, the actuator valve disc disposed within the regulator valve and adapted for displacement between a closed position engaging a downstream side of the valve port and an open position disposed away from the valve port, and a secondary device coupled to the regulator valve and configured to sense an input pressure and to perform a responsive action if the sensed input pressure varies from a secondary device setpoint pressure, the improvement comprising:

a Pitot tube having a first end with a sensing point disposed within the outlet of the regulator valve, a first branch extending toward the actuator, and a second branch extending toward the secondary device, wherein the first end and the first branch of the Pitot tube place the sensing point and outlet in fluid communication with an interior of the actuator, wherein the first end and the second branch of the Pitot tube place the sensing point and the outlet in fluid communication with an interior of the secondary device, wherein the actuator is configured to cause the actuator valve disc to move toward the valve port when the pressure at the sensing point of the Pitot tube increases and to cause the actuator valve disc to move away from the valve port when the pressure at the sensing point decreases to maintain a pressure downstream of the fluid regulating device approximately equal to a regulator setpoint pressure, and wherein the pressure at the sensing point is the input pressure of the secondary device; and one of (a) through (c) as follows:
(a) wherein the secondary device comprises a slam shut safety device comprising a slam shut plug, the slam shut plug disposed within the regulator valve and adapted for displacement between a closed position engaging an upstream side of the valve port and an open position disposed away from the valve port, wherein the secondary device setpoint pressure is a maximum setpoint pressure that is greater than the regulator setpoint pressure, and wherein the responsive action of the slam shut safety device is causing the slam shut plug to engage the upstream side of the valve port to close the regulator valve and stop a fluid flow through the regulator valve when the pressure at the sensing point exceeds the maximum setpoint pressure, and wherein the slam shut safety device is configured so that the slam shut plug must be manually reset to the open position after slam shut plug moves to the closed position,
(b) wherein the secondary device comprises a slam shut safety device comprising a slam shut plug, the slam shut plug disposed within the regulator valve and adapted for displacement between a closed position engaging an upstream side of the valve port and an open position disposed away from the valve port, wherein the secondary device setpoint pressure is a minimum setpoint pressure that is less than the regulator setpoint pressure, and wherein the responsive action of the slam shut safety device is causing the slam shut plug to engage the upstream side of the valve port to close the regulator valve and stop a fluid flow through the regulator valve when the pressure at the sensing point falls below the minimum setpoint pressure, and wherein the slam shut safety device is configured so that the slam shut plug must be manually reset to the open position after slam shut plug moves to the closed position,
(c) wherein the fluid regulating device includes a cylindrical housing disposed in the regulator valve and having an inner diameter that is sized and configured to slidably receive the actuator valve disc when the valve disc moves between the open and closed positions, wherein the housing includes a passage therethrough to which the first branch of the Pitot tube is connected to place the sensing point of the Pitot tube in fluid communication with the interior of the actuator, wherein the actuator comprises an actuator stem operatively connected to the actuator valve disc to move the actuator valve disc between the open and the closed positions, and a stem guide disposed within an actuator mouth of actuator proximate the regulator valve and slidably engaging the actuator stem, wherein the stem guide includes channels therethrough such that the first branch of the Pitot tube, the passage of the housing and the channels of the stem guide place the sensing point of the Pitot tube in fluid communication with the interior of the actuator.

7. A fluid regulating device in accordance with claim 6, wherein the fluid regulating device includes an actuator balancing diaphragm operatively connected to the actuator valve disc and having a first side in fluid communication with an upstream pressure of fluid flowing through the valve port, wherein the upstream pressure applies a force to the actuator valve disc in the direction of the open position, and the upstream pressure acting on the first side of the actuator balancing diaphragm applies a force to the valve disc in the direction of the closed position and approximately equal to the force of the upstream pressure on the actuator valve disc.

8. A fluid regulating device in accordance with claim 6, wherein the secondary device is a monitoring device comprising a monitor valve disc, the monitor valve disc disposed within the regulator valve and adapted for displacement between a closed position engaging an upstream side of the valve port and an open position disposed away from the valve port, wherein the secondary device setpoint pressure is a monitor cutoff pressure that is greater than the regulator setpoint pressure, and wherein the responsive action of the monitoring device is causing the monitor valve disc to engage the upstream side of the valve port to close the regulator valve and stop a fluid flow though the regulator valve when the pressure at the sensing point exceeds the monitor cutoff pressure.

9. A fluid regulating device in accordance with claim 8, wherein the monitoring device comprises a monitor balancing diaphragm operatively connected to the monitor valve disc and having a first side in fluid communication with an upstream pressure of fluid flowing through the valve port, wherein the upstream pressure applies a force to the monitor valve disc in the direction of the open position, and the upstream pressure acting on the first side of the monitor balancing diaphragm applies a force to the valve disc in the direction of the closed position and approximately equal to the force of the upstream pressure on the monitor valve disc.

10. A fluid regulating device in accordance with claim 6, wherein the regulator valve has a passage therethrough proximate the outlet and the secondary device and having the second branch of the Pitot tube connected thereto, wherein the fluid regulating device includes a coupling module connecting the secondary device to the regulator valve and having a passage aligning with the passage of the regulator valve, wherein the second branch of the Pitot tube, the passage of the regulator valve and the passage of the coupling module place the sensing point in fluid communication with the interior of the secondary device.

11. A dual sensing mechanism for a fluid regulating device having a regulator valve having an inlet, an outlet, and a valve port disposed between the inlet and the outlet, an actuator coupled to the regulator valve and comprising an actuator valve disc, the actuator valve disc disposed within the regulator valve and adapted for displacement between a closed position engaging a downstream side of the valve port and an open position disposed away from the valve port, and a secondary device coupled to the regulator valve and configured to sense an input pressure and to perform a responsive action if the sensed input pressure varies from a secondary device setpoint pressure, the dual sensing mechanism comprising:
a Pitot tube having a first end with a sensing point disposed within the outlet of the regulator valve;
a first branch extending from the Pitot tube toward the actuator, wherein the Pitot tube and the first branch place the sensing point and the outlet in fluid communication with an interior of the actuator e; and
a second branch extending from the Pitot tube toward the secondary device, wherein the Pitot tube and the second branch of the Pitot tube place the sensing point and the outlet in fluid communication with an interior of the secondary device, wherein the actuator is configured to cause the actuator valve disc to move toward the valve port when the pressure at the sensing point of the Pitot tube increases and to cause the actuator valve disc to move away from the valve port when the pressure at the sensing point decreases to maintain a pressure downstream of the fluid regulating device approximately equal to a regulator setpoint pressure, and wherein the pressure at the sensing point is the input pressure of the secondary device, and one of (a) through (c), as follows:

(a) wherein the secondary device comprises a slam shut safety device comprising a slam shut plug, the slam shut plug disposed within the regulator valve and adapted for displacement between a closed position engaging an upstream side of the valve port and an open position disposed away from the valve port, wherein the secondary device setpoint pressure is a maximum setpoint pressure that is greater than the regulator setpoint pressure, and wherein the responsive action of the slam shut safety device is causing the slam shut plug to engage the upstream side of the valve port to close the regulator valve and stop a fluid flow through the regulator valve when the pressure at the sensing point exceeds the maximum setpoint pressure, and wherein the slam shut safety device is configured so that the slam shut plug must be manually reset to the open position after slam shut plug moves to the closed position, (b) wherein the secondary device comprises a slam shut safety device comprising a slam shut plug, the slam shut plug disposed within the regulator valve and adapted for displacement between a closed position engaging an upstream side of the valve port and an open position disposed away from the valve port, wherein the secondary device setpoint pressure is a minimum setpoint pressure that is less than the regulator setpoint pressure, and wherein the responsive action of the slam shut safety device is causing the slam shut plug to engage the upstream side of the valve port to close the regulator valve and stop a fluid flow through the regulator valve when the pressure at the sensing point falls below the minimum setpoint pressure, and wherein the slam shut safety device is configured so that the slam shut plug must be manually reset to the open position after slam shut plug moves to the closed position, (c) wherein the fluid regulating device includes a cylindrical housing disposed in the regulator valve and having an inner diameter that is sized and configured to slidably receive the actuator valve disc when the valve disc moves between the open and closed positions, wherein the housing includes a passage therethrough to which the first branch is connected to place the sensing point of the Pitot tube in fluid communication with the interior of the actuator, wherein the actuator comprises an actuator stem operatively connected to the actuator valve disc to move the actuator valve disc between the open and the closed positions, and a stem guide disposed within an actuator mouth of actuator proximate the regulator valve and slidably engaging the actuator stem, wherein the stem guide includes channels therethrough such that the Pitot tube, the first branch, the passage of the housing and the channels of the stem guide place the sensing point of the Pitot tube in fluid communication with the interior of the actuator.

12. A dual sensing mechanism in accordance with claim 11, wherein the fluid regulating device includes an actuator balancing diaphragm operatively connected to the actuator valve disc and having a first side in fluid communication with an upstream pressure of fluid flowing through the valve port, wherein the upstream pressure applies a force to the actuator valve disc in the direction of the open position, and the upstream pressure acting on the first side of the actuator balancing diaphragm applies a force to the valve disc in the direction of the closed position and approximately equal to the force of the upstream pressure on the actuator valve disc.

13. A dual sensing mechanism in accordance with claim 11, wherein the secondary device is a monitoring device comprising a monitor valve disc, the monitor valve disc disposed within the regulator valve and adapted for displacement between a closed position engaging an upstream side of the valve port and an open position disposed away from the valve port, wherein the secondary device setpoint pressure is a monitor cutoff pressure that is greater than the regulator setpoint pressure, and wherein the responsive action of the monitoring device is causing the monitor valve disc to engage the upstream side of the valve port to close the regulator valve and stop a fluid flow though the regulator valve when the pressure at the sensing point exceeds the monitor cutoff pressure.

14. A dual sensing mechanism in accordance with claim 11, wherein the monitoring device comprises a monitor balancing diaphragm operatively connected to the monitor valve disc and having a first side in fluid communication with an upstream pressure of fluid flowing through the valve port, wherein the upstream pressure applies a force to the monitor valve disc in the direction of the open position, and the upstream pressure acting on the first side of the monitor balancing diaphragm applies a force to the valve disc in the direction of the closed position and approximately equal to the force of the upstream pressure on the monitor valve disc.

* * * * *

UNITED STATES PATENT AND TRADEMARK OFFICE
CERTIFICATE OF CORRECTION

| | | |
|---|---|---|
| PATENT NO. | : 8,286,660 B2 | |
| APPLICATION NO. | : 12/427419 | |
| DATED | : October 16, 2012 | |
| INVENTOR(S) | : Jason S. Mevius et al. | |

It is certified that error appears in the above-identified patent and that said Letters Patent is hereby corrected as shown below:

<u>In the Specification:</u>

At Column 3, line 39, "situations" should be -- situation --.

At Column 10, line 61, "know to" should be -- known to --.

<u>In the Claims:</u>

At Column 20, line 62, "actuator e" should be -- actuator --.

Signed and Sealed this
Fifth Day of August, 2014

Michelle K. Lee
*Deputy Director of the United States Patent and Trademark Office*